(12) United States Patent
Lee

(10) Patent No.: US 10,094,432 B2
(45) Date of Patent: Oct. 9, 2018

(54) ONE-WAY WEDGE CLUTCH

(71) Applicant: Schaeffler Technologies AG & Co. KG, Herzogenaurach (DE)

(72) Inventor: Brian Lee, York, SC (US)

(73) Assignee: Schaefffler Technologies AG & Co. KG, Herzogenaurach (DE)

( * ) Notice: Subject to any disclaimer, the term of this patent is extended or adjusted under 35 U.S.C. 154(b) by 92 days.

(21) Appl. No.: 15/181,611

(22) Filed: Jun. 14, 2016

(65) Prior Publication Data

US 2017/0356505 A1    Dec. 14, 2017

(51) Int. Cl.
*F16D 41/063*    (2006.01)
*F16D 41/04*    (2006.01)
*F16D 41/20*    (2006.01)

(52) U.S. Cl.
CPC ........... *F16D 41/063* (2013.01); *F16D 41/04* (2013.01); *F16D 41/20* (2013.01)

(58) Field of Classification Search
CPC ......... F16D 41/063; F16D 41/04; F16D 41/20
See application file for complete search history.

(56) References Cited

U.S. PATENT DOCUMENTS

| | | | | |
|---|---|---|---|---|
| 2,150,715 A | * | 3/1939 | De Falco | F16D 41/063 |
| | | | | 192/45.1 |
| 3,202,251 A | * | 8/1965 | Fulton | F16D 41/063 |
| | | | | 192/104 B |
| 3,235,046 A | * | 2/1966 | Fulton | F16D 41/073 |
| | | | | 192/45.1 |
| 3,877,556 A | * | 4/1975 | Brownscombe | F16D 41/063 |
| | | | | 192/45.1 |
| 5,678,668 A | * | 10/1997 | Sink | F16D 41/12 |
| | | | | 192/45.1 |
| 6,082,512 A | * | 7/2000 | Marks | F16D 41/08 |
| | | | | 192/43 |
| 2013/0340574 A1 | * | 12/2013 | Buchanan | B25B 13/461 |
| | | | | 81/60 |
| 2014/0014455 A1 | * | 1/2014 | Davis | F16D 41/063 |
| | | | | 192/45.1 |
| 2014/0332335 A1 | * | 11/2014 | Strong | F16D 41/06 |
| | | | | 192/43 |

\* cited by examiner

*Primary Examiner* — Mark A Manley
(74) *Attorney, Agent, or Firm* — Brooks Kushman P.C.

(57) ABSTRACT

A one-way clutch, comprising an inner race including a first outer circumference with a first plurality of ramps, at least one clutch ring including a first inner circumference with a second plurality of ramps and a second outer circumference with a plurality of projections, and an outer race including a second inner circumference with a plurality of grooves. The outer race is operatively arranged to rotate with respect to the inner race in a first circumferential direction and non-rotatably connect to the inner race when rotated in a second circumferential direction, opposite the first circumferential direction.

17 Claims, 5 Drawing Sheets

ONE-WAY WEDGE CLUTCH

FIELD

The present disclosure relates to a one-way wedge clutch, in particular, a cylindrical one-way wedge clutch with a grooved feature for minimizing the total required radial space.

BACKGROUND

There are many types of one-way clutches (e.g., roller, sprag, strut, rocker, etc.). All of these individual torque transmission elements are arranged in some sort of diametrical geometry that permit rotation in one direction but not the other. These torque transmission elements also use springs to ensure constant contact between the inner race and outer race. However, one-way wedge clutches require a large radial space and often use many components.

SUMMARY

According to aspects illustrated herein, there is provided a one-way clutch, comprising an inner race including a first outer circumference with a first plurality of ramps, at least one clutch ring including a first inner circumference with a second plurality of ramps and a second outer circumference with a plurality of projections, and an outer race including a second inner circumference with a plurality of grooves. The outer race is operatively arranged to rotate with respect to the inner race in a first circumferential direction and non-rotatably connect to the inner race when rotated in a second circumferential direction, opposite the first circumferential direction.

According to aspects illustrated herein, there is provided a one-way clutch, comprising an inner race comprising a first outer circumference including a first plurality of ramps, at least one clutch ring comprising a first inner circumference including a second plurality of ramps and a second outer circumference including a plurality of projections, the at least one clutch ring is elastic and radially expandable, and an outer race comprising a second inner circumference including a plurality of grooves. The outer race is operatively arranged to rotate with respect to the inner race in a first circumferential direction and to non-rotatably connect to the inner race when rotated in a second circumferential direction opposite the first circumferential direction.

According to aspects illustrated herein, there is provided a one-way clutch, comprising an inner race comprising a first outer circumference including a first plurality of ramps, at least one clutch ring comprising a first inner circumference including a second plurality of ramps, a second outer circumference including a plurality of projections, and a radially disposed gap separating first and second ends of the at least one clutch ring and the at least one clutch ring is discontinuous in a first or second circumferential direction at the gap, the at least one clutch ring is elastic and radially expandable, and an outer race comprising a second inner circumference including a plurality of grooves. In a freewheel mode, the outer race is operatively arranged to rotate with respect to the inner race in the first circumferential direction, and in a locked mode, the outer race rotates with respect to the inner race in the second circumferential direction, the second plurality of ramps ride up the first plurality of ramps, the at least one clutch ring radially expands, and the inner race, the at least one clutch ring, and the outer race non-rotatably connect.

It therefore is an object of the disclosure to provide a cylindrical one-way wedge clutch with minimal components and required radial space.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 1:
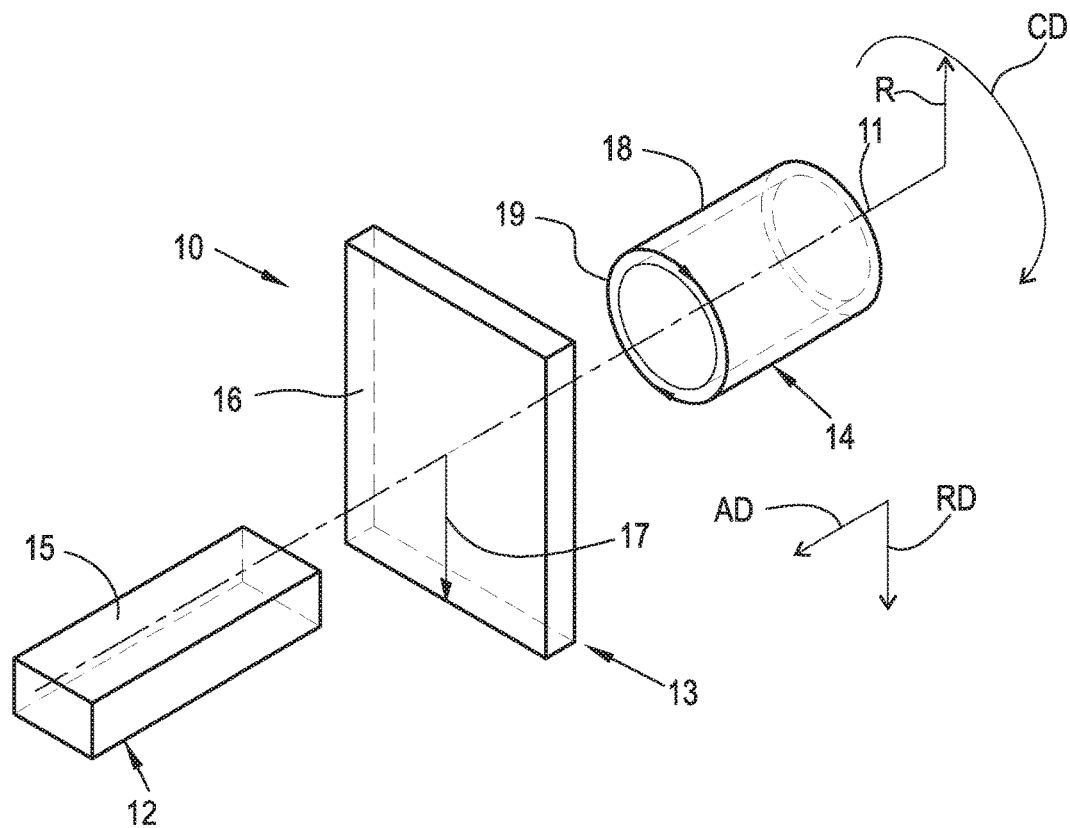
FIG. 1 is a perspective view of a cylindrical coordinate system demonstrating spatial terminology used in the present application.

Adverting now to the figures, FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 22, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
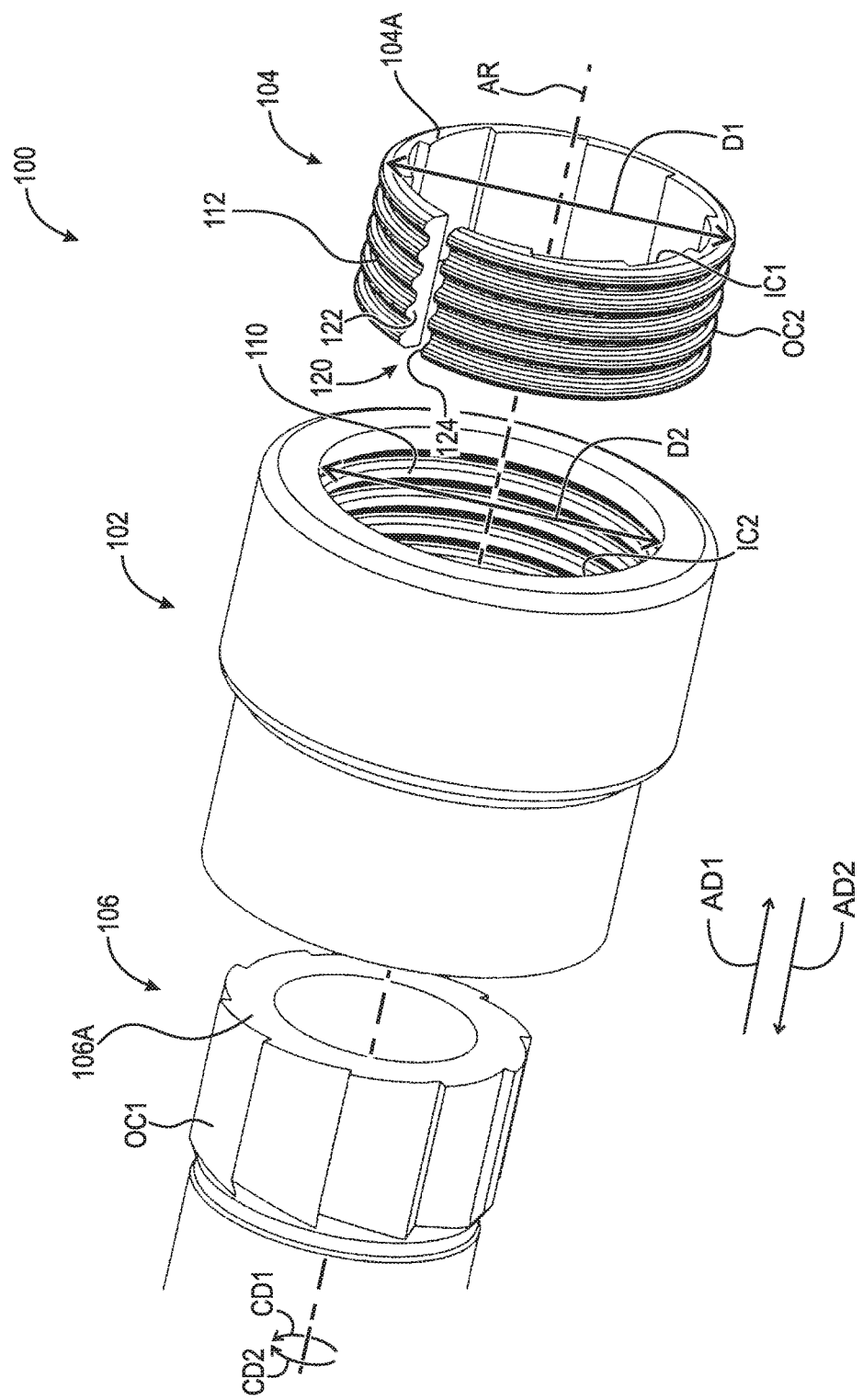
FIG. 2 is an exploded perspective view of a cylindrical one-way wedge clutch assembly.

FIG. 2 is an exploded perspective view of cylindrical one-way wedge clutch assembly 100. Cylindrical one-way wedge clutch assembly 100 includes outer race 102, clutch ring 104, and inner race 106. In an example embodiment, cylindrical one-way wedge clutch assembly 100 includes two clutch rings; however, it should be appreciated that any other suitable number of clutch rings can be used. Inner race 106 includes outer circumference OC1 comprising a plurality of ramps 106A arranged circumferentially thereon. Inner race 106 is capable of being non-rotatably connected to an input shaft. In an example embodiment, inner race 106 is fixedly secured to an input shaft. Clutch ring 104 is a circular tube comprising at least one circumferential gap 120 separating ends 122 and 124 of clutch ring 104, such that it is discontinuous in a circumferential direction and is capable of expanding radially outward. Clutch ring 104 includes inner circumference IC1 comprising plurality of ramps 104A arranged circumferentially thereon, and outer circumference OC2 comprising plurality of circumferential projections 112. Outer race 102 is a circular tube and includes inner circumference IC2 comprising a plurality of circumferential grooves 110. Outer race 102 is capable of being non-rotatably connected to an output shaft. In an example embodiment, outer race 106 is fixedly secured to an output shaft.

Figure 3:
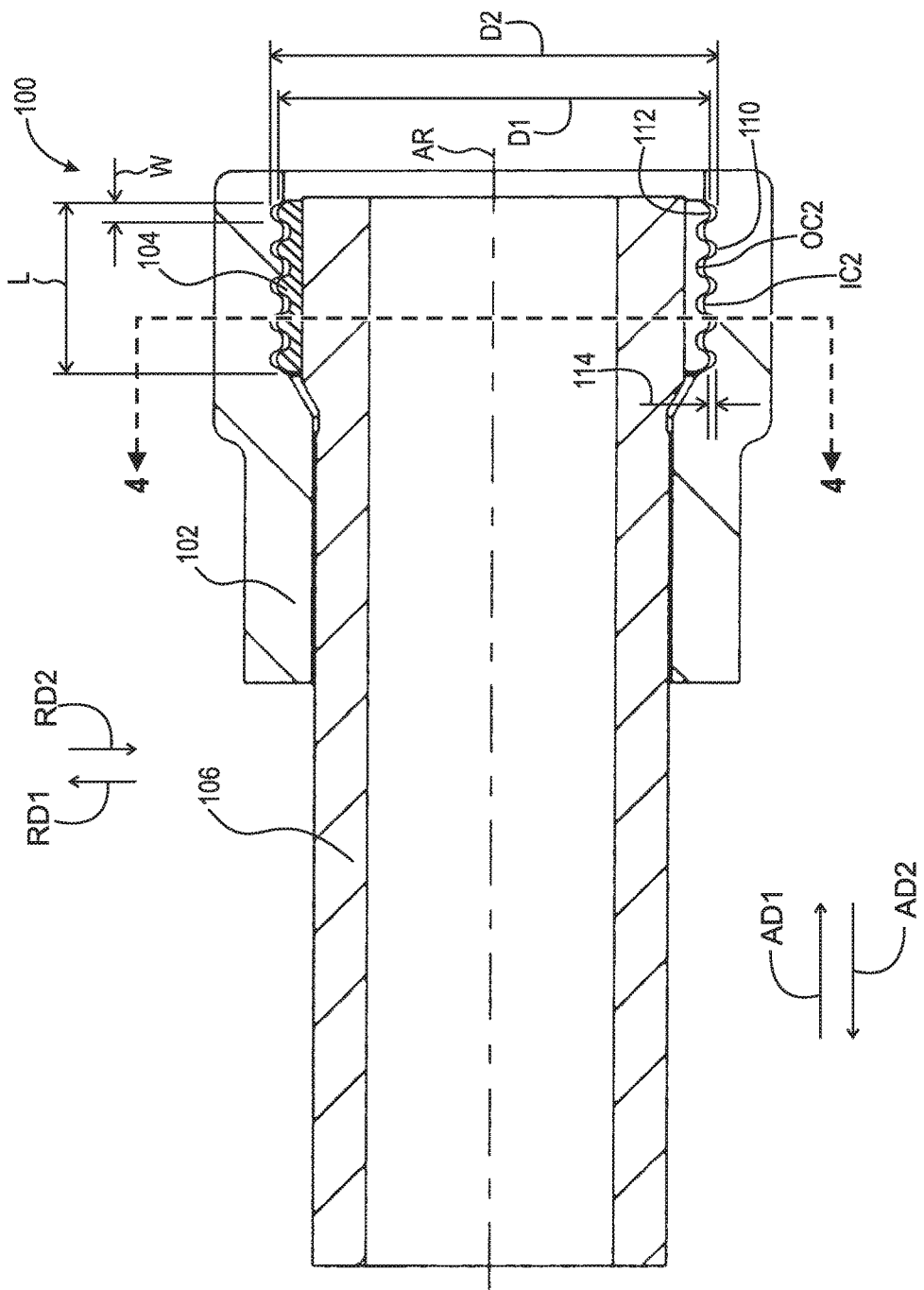
FIG. 3 is cross-sectional view of the one-way wedge clutch assembly of FIG. 2 in a freewheel mode.

FIG. 3 is cross-sectional view of cylindrical one-way wedge clutch assembly 100 as shown in FIG. 2 in a freewheel mode. Outer race 102, clutch ring 104, and inner race 106 are concentrically arranged around axis of rotation AR. Clutch ring 104 is radially located between inner race 106 and outer race 102 and is axially arranged such that circumferential projections 112 mesh with circumferential grooves 110. In the freewheel mode, clutch ring 104 outer circumference OC2 is separated from outer race 102 inner circumference IC2 by radial gap 114. In general, clutch ring 104 is elastic in a circumferential direction due to circumferential gap 120 and diameter D1 for outer circumference OC2 of clutch ring 104 in a freewheel mode is generally less than diameter D2 of inner circumference IC2 of outer race 102. Therefore, when clutch ring 104 is installed in outer race 102, circumferential gap 120 is at normal size or reduced and circumferential projections 112 at least partially mesh with circumferential grooves 110. In an example embodiment, outer circumference OC2 projections 112 are shaped to form chamfers and inner circumference IC2 grooves 110 are configured to form V-shaped indents in which the chamfers are disposed. It should be appreciated, however, that any other surface design capable of meeting the frictional threshold for both the freewheel mode and the locking mode can be used. Proper design and function of a one-way wedge clutch requires that the frictional engagement between clutch ring 104 and outer race 102 be as consistent as possible. The area of contact between clutch ring 104 and outer race 102 is dependent on length L of clutch ring 104, the number of chamfers, and the width W of each chamfer. For example, increasing width W increases the frictional contact between clutch ring 104 and outer race 102 during free wheel mode. Similarly, increasing the number of chamfers and/or length L increases the frictional contact between clutch ring 104 and outer race 102.

Figure 4:
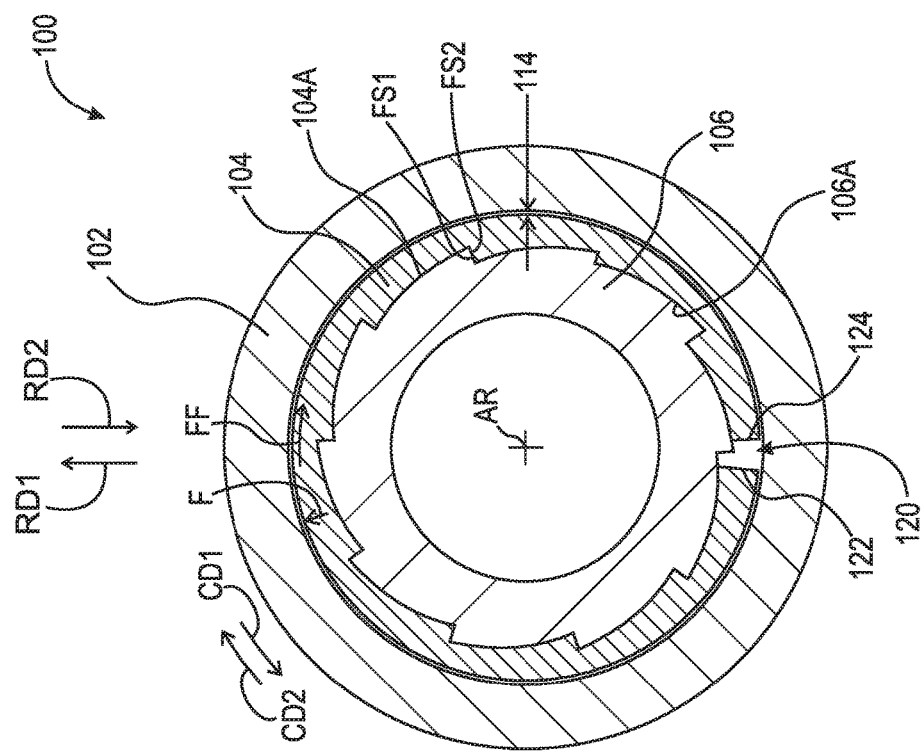
FIG. 4 is a cross-sectional view taken generally along line 4-4 in FIG. 3.

FIG. 4 is a cross-sectional view taken generally along line 4-4 in FIG. 3. Outer race 102, clutch ring 104, and inner race 106 are concentrically arranged around axis of rotation AR. Inner race 106 is circumferentially arranged within clutch ring 104 such that ramps 106A are fully engaged with ramps 104A. Outer race 102 is able to rotate with respect to inner race 106 in circumferential direction CD1. In the freewheel mode, frictional torque FF, opposing rotation of the outer race in direction CD1, is needed to enable the switch from the freewheel mode to the locking mode. A magnitude of frictional torque FF is proportional to a magnitude of radial force F (as radial force F increases, frictional torque FF likewise increases). The magnitude of radial force F depends on the characteristics of clutch ring 104 (for example, the difference in respective diameters between outer circumference OC2 and inner circumference IC2 and the stiffness of clutch ring 104). In an example embodiment, all of the respective surfaces FS1 and FS2 for ramps 104A and 106A are in contact in the freewheel mode. It should be appreciated, however, that not all respective surfaces FS1 and FS2 for ramps 104A and 106A need be in contact in the freewheel mode. In an example embodiment, one or more respective surfaces FS1 and FS2 for ramps 104A and 106A are in contact in the freewheel mode.

Figure 5:
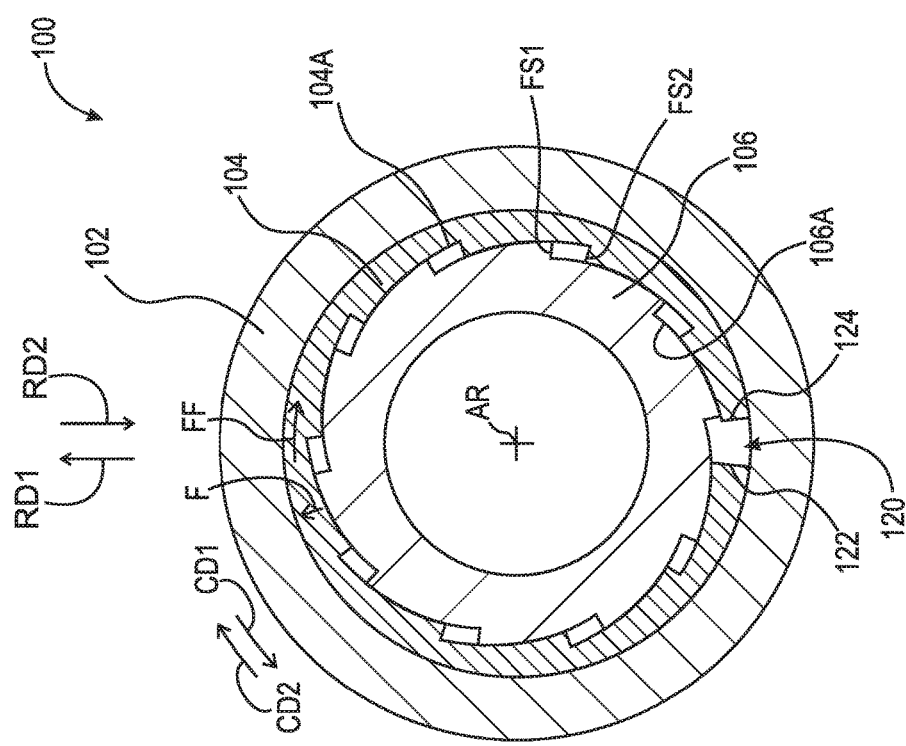
FIG. 5 is a cross-sectional view of the one-way wedge clutch assembly shown in FIG. 4, except in a locking mode.

FIG. 5 is a cross-sectional view of cylindrical one-way wedge clutch assembly 100 as shown in FIG. 4, except in a locking mode. In the locking mode, the rotation of outer race 102 is locked to the rotation of inner race 106 by rotation of outer race 102 in circumferential direction CD2, opposite circumferential direction CD1. To shift from the freewheel mode to the locking mode, outer race 102 rotates, or displaces, clutch ring 104 in direction CD2 so that ramps 104A of clutch ring 104 shift in direction CD2 with respect to ramps 106A of inner race 106. The shifting of the ramps causes ramps 104A and 106A to lock and causes clutch ring 104 to radially expand against outer race 102, rotationally locking inner race 106, clutch ring 104, and outer race 102. In an example embodiment, none of the respective surfaces FS1 and FS2 for ramps 104A and 106A are in contact in the locking mode. It should be appreciated, however, that some of respective surfaces FS1 and FS2 for ramps 104A and 106A can be in contact in the locking mode. In the locking mode, circumferential gap 120 is expanded and the elasticity of clutch ring 104 urges clutch ring 104 radially outward to contact outer race 102 and exert radially outward force on inner circumference IC2. To enable outer race 102 to rotate clutch ring 104, there must be at least some frictional engagement of outer race 102 with clutch ring 104 in the freewheel mode (outer race 102 rotates in direction CD1). If there is no frictional engagement or insufficient frictional engagement, outer race 102 simply rotates in direction CD2 without displacing clutch ring 104. That is, frictional torque FF must be present to some degree. Contact of outer circumference OC2 with inner circumference IC2, specifically between circumferential projections 112 and circumferential grooves 110, provides frictional torque FF.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Cylindrical coordinate system
11 Longitudinal axis
12 Object
13 Object
14 Object
15 Axial surface
16 Radial surface
17 Radius
18 Surface
19 Circumference
AD Axial direction
CD Circumferential direction
RD Radial direction
100 Cylindrical one-way clutch assembly
102 Outer race
104 Clutch ring
104A Clutch ring ramps
106 Inner race
106A Inner race ramps
110 Outer race circumferential grooves
112 Clutch ring circumferential projections
114 Radial gap
120 Circumferential gap
122 Circumferential gap end
124 Circumferential gap end
OC1 Inner race outer circumference
OC2 Clutch ring outer circumference
IC1 Clutch ring inner circumference
IC2 Outer race inner circumference
D1 Clutch ring outer diameter
D2 Outer race inner diameter
L Clutch ring length
W Projection chamfer width
FS1 Inner race ramps contact surfaces
FS2 Clutch ring ramps contact surfaces
F Radial force
FF Frictional torque
AR Axis of rotation
AD1 Axial direction one
AD2 Axial direction two
CD1 Circumferential direction one
CD2 Circumferential direction two
RD1 Radial direction one
RD2 Radial direction two

What is claimed is:

1. A one-way clutch for selectively coupling first and second shafts, comprising:
   an inner race connectable to an input shaft and comprising a first outer surface including a first plurality of ramps;
   a tubular clutch ring comprising a first inner surface including a second plurality of ramps, and a second outer surface defining a plurality of circumferential projections axially spaced and integrally formed with the tubular clutch ring; and
   an outer race connectable to an output shaft and comprising a second inner surface defining a plurality of circumferential grooves axially spaced such that each of the grooves receives one of the projection therein, wherein the outer race is operatively arranged to rotate with respect to the inner race in a first circumferential direction and to non-rotatably connect to the inner race when rotated in a second circumferential direction opposite the first circumferential direction.

2. The one-way clutch as recited in claim 1, wherein the clutch ring is elastic and radially expandable.

3. The one-way clutch as recited in claim 2, wherein:
   in a freewheel mode of the one-way clutch, the outer race rotates with respect to the inner race in the first circumferential directional; and
   in a locked mode of the one-way clutch, the outer race rotates with respect to the inner race in the second circumferential direction, the second plurality of ramps ride up the first plurality of ramps, the clutch ring radially expands, and the inner race, the clutch ring, and the outer race non-rotatably connect.

4. The one-way clutch as recited in claim 3, wherein the plurality of projections mesh with the plurality of grooves, wherein:
   in the freewheel mode, the plurality of projections partially mesh with the plurality of grooves such that the outer race is rotatable relative to the clutch ring and the inner race; and
   in locked mode, the plurality of projections fully mesh with the plurality of grooves such that the outer race, the clutch ring, and the inner race are non-rotatably connected.

5. The one-way clutch as recited in claim 4, wherein the clutch ring comprises a radially disposed gap separating first and second ends of the clutch ring, and the at least one clutch ring is discontinuous in the first or second circumferential direction at the gap.

6. The one-way clutch as recited in claim 4, wherein the plurality of projections are shaped to form chamfers and the plurality of grooves are configured to form V-shaped indents in which the plurality of projections are disposed.

7. A one-way clutch, comprising:
   an inner race comprising a first outer surface including a first plurality of ramps;
   a clutch ring comprising an elongated cylinder body including a first inner surface having a second plurality of ramps and a second outer surface defining a plurality of axially spaced circumferential projections integrally formed with the body; and
   an outer race comprising a second inner surface defining a plurality of circumferential grooves axially spaced such that each of the grooves receives one of the projection therein, wherein the first and second ramps are configured such that the body radially expands causing the projections to fictionally lock to the grooves in response to the inner race rotating in a first direction, and such that the body does not expand permitting the projections to rotate relative to the grooves in response to the inner race rotating a second direction opposite the first.

8. The one-way clutch as recited in claim 7, wherein, in a locked mode of the one-way clutch corresponding to rotation of the inner race in the first direction, the outer race rotates with respect to the inner race in the second direction and the second plurality of ramps ride up the first plurality of ramps to radially expand the body.

9. The one-way clutch as recited in claim 7, wherein the body defines a gap separating first and second ends of the body.

10. The one-way clutch as recited in claim 7, wherein the plurality of projections are shaped to form chamfers and the plurality of grooves are configured to form V-shaped indents in which the plurality of projections are disposed.

11. The one-way clutch as recited in claim 7, wherein the inner race is operatively arranged to non-rotatably connect to an input shaft.

12. The one-way clutch as recited in claim 7, wherein the outer race is operatively arranged to non-rotatably connect to an output shaft.

13. A one-way clutch comprising:
an inner race comprising a first outer circumference including a first plurality of ramps;
an elongated cylindrical clutch element, comprising:
 a first inner surface including a second plurality of ramps;
 a second outer surface including a plurality of circumferential raised rings axially spaced from each other and integrally formed with the clutch element; and
an elongated cylindrical outer race comprising a second inner surface defining a plurality of circular grooves axially spaced to receive the raised rings;
wherein:
 in a freewheel mode, the outer race is operatively arranged to rotate with respect to the inner race in a first circumferential direction; and
 in a locked mode, the outer race rotates with respect to the inner race in a second circumferential direction, the second plurality of ramps ride up the first plurality of ramps, the clutch element radially expands, and the inner race, the clutch element, and the outer race lock.

14. The one-way clutch as recited in claim 13, wherein:
in the freewheel mode, the plurality of raised rings partially mesh with the plurality of grooves such that the outer race is rotatable relative to the clutch element and the inner race; and
in the locked mode, the plurality of raised rings fully mesh with the plurality of grooves such that the outer race, the clutch element, and the inner race are locked.

15. The one-way clutch as recited in claim 13, wherein the plurality of raised rings are shaped to form chamfers and the plurality of grooves define V-shaped indents in which the plurality of raised rings are disposed.

16. The one-way clutch as recited in claim 13 further comprising:
an input shaft fixed to one of the inner race and the outer race; and
an output shaft fixed to the other of the inner race and the outer race.

17. The one-way clutch as recited in claim 13, wherein each of the first and second ramps defining radially extending walls, and the radially extending walls of the first ramps engage with the radially extending walls of the second ramps when in the freewheel mode and move away from each other when in the locked mode.

* * * * *